No. 837,107. PATENTED NOV. 27, 1906.
M. OTTO.
APPARATUS FOR THE STERILIZATION OF WATER BY MEANS
OF AN ELECTRIC CURRENT.
APPLICATION FILED JULY 1, 1904. RENEWED MAR. 13, 1906.

5 SHEETS—SHEET 1.

WITNESSES
H. G. Dieterich
H. H. Simms

INVENTOR
Marius Otto
BY
Knight Bros.
Attorneys

No. 837,107. PATENTED NOV. 27, 1906.
M. OTTO.
APPARATUS FOR THE STERILIZATION OF WATER BY MEANS
OF AN ELECTRIC CURRENT.
APPLICATION FILED JULY 1, 1904. RENEWED MAR. 13, 1906.
5 SHEETS—SHEET 2.
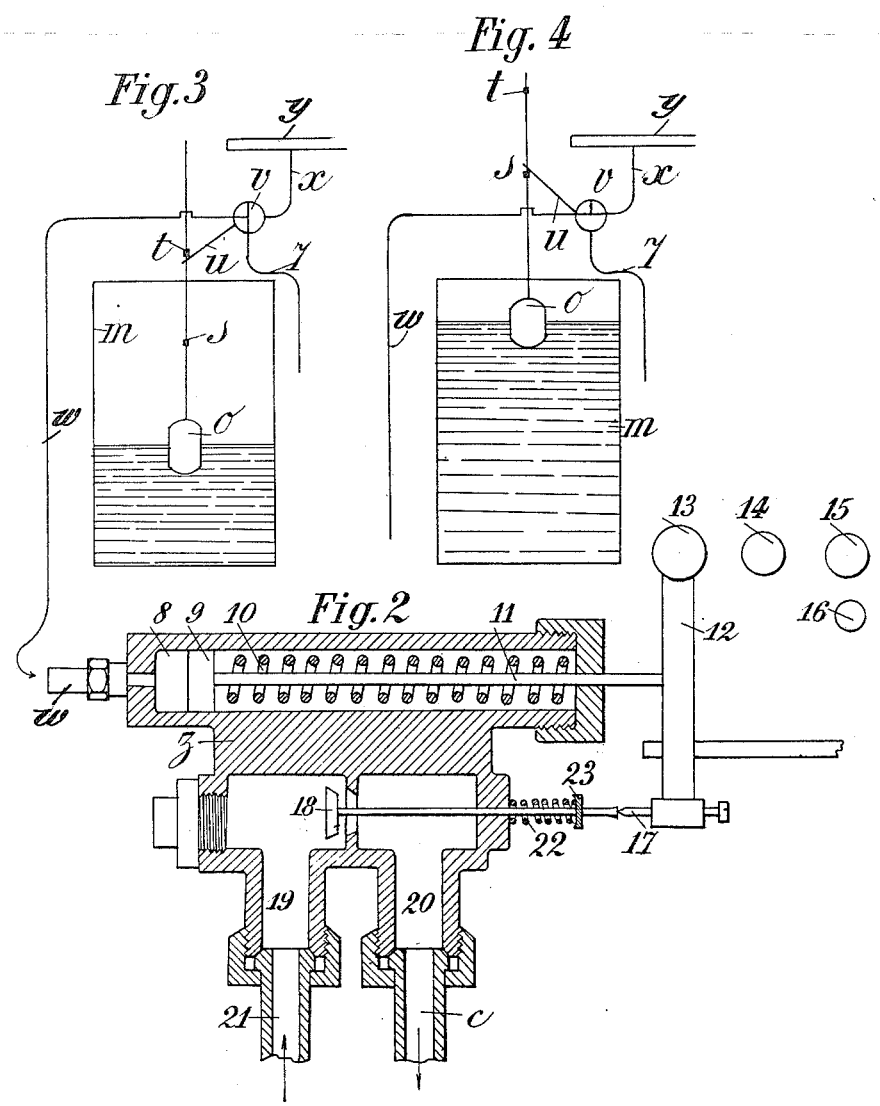
Witnesses
Inventor
Marius Otto
ATTORNEYS No. 837,107. PATENTED NOV. 27, 1906.
M. OTTO.
APPARATUS FOR THE STERILIZATION OF WATER BY MEANS OF AN ELECTRIC CURRENT.
APPLICATION FILED JULY 1, 1904. RENEWED MAR. 13, 1906.
5 SHEETS—SHEET 3.
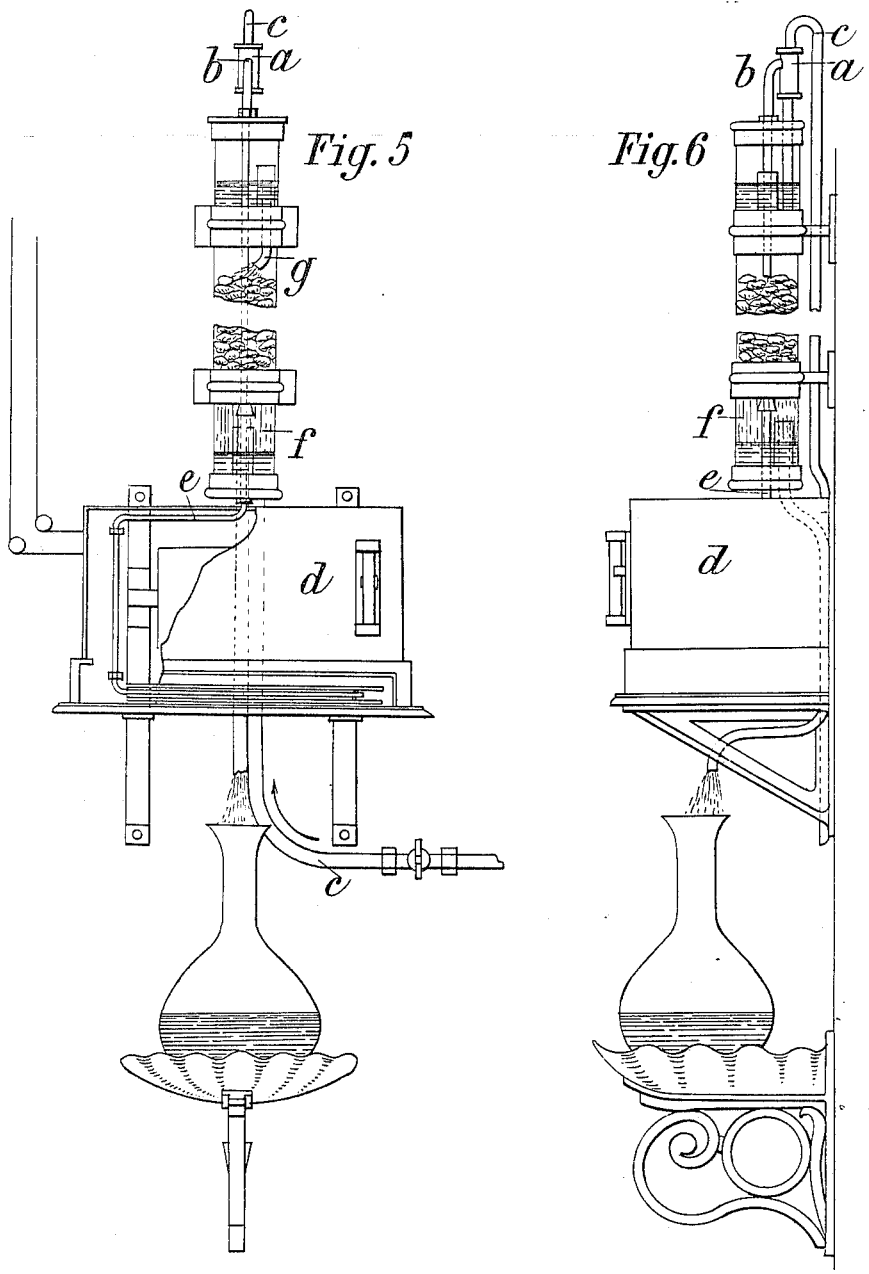

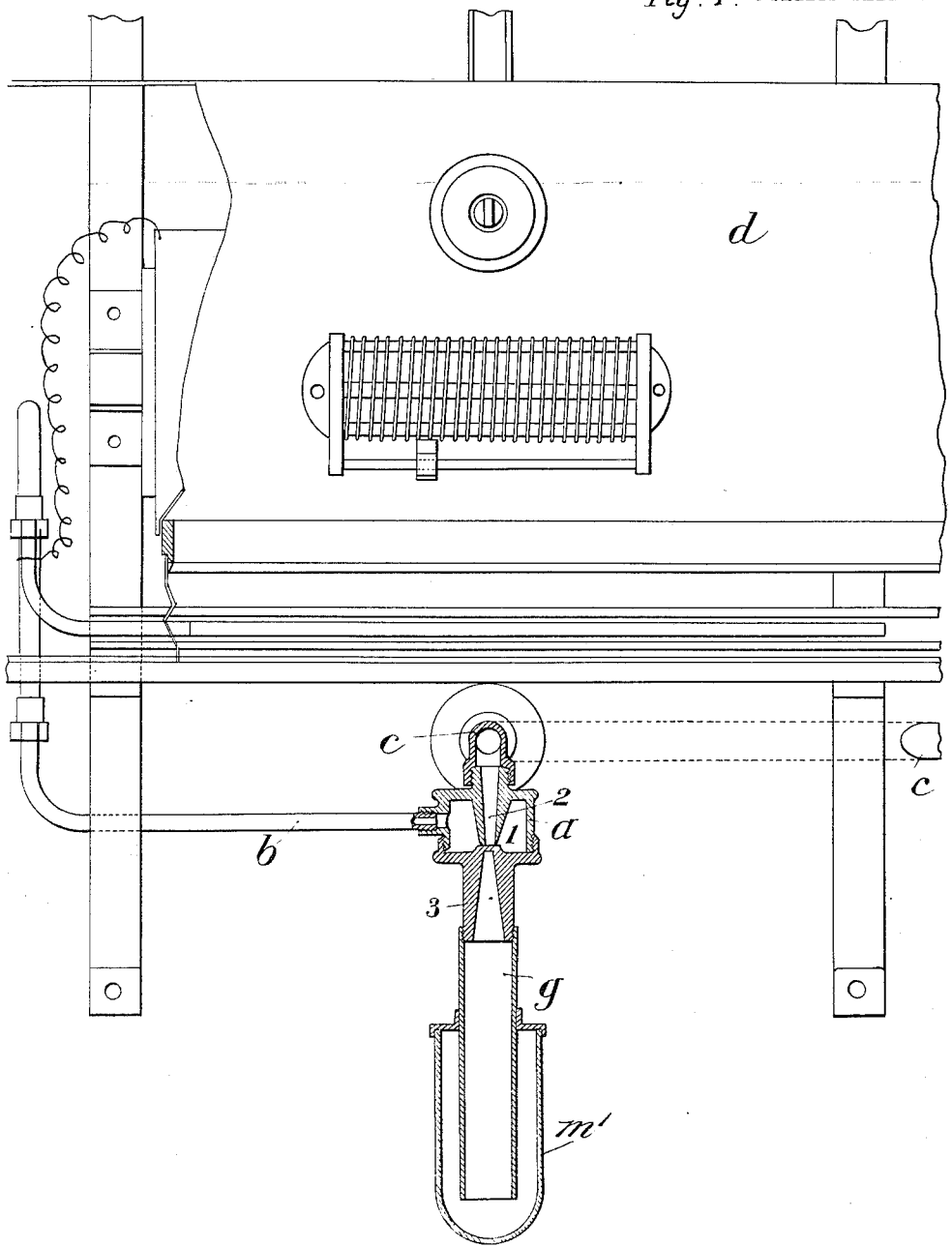

No. 837,107. PATENTED NOV. 27, 1906.
M. OTTO.
APPARATUS FOR THE STERILIZATION OF WATER BY MEANS OF AN ELECTRIC CURRENT.
APPLICATION FILED JULY 1, 1904. RENEWED MAR. 13, 1906.

5 SHEETS—SHEET 5.

Witnesses
Inventor
Marius Otto

UNITED STATES PATENT OFFICE.

MARIUS OTTO, OF PARIS, FRANCE, ASSIGNOR TO AMERICAN OZONE COMPANY, OF NIAGARA FALLS, NEW YORK, A CORPORATION OF NEW YORK.

APPARATUS FOR THE STERILIZATION OF WATER BY MEANS OF AN ELECTRIC CURRENT.

No. 837,107.      Specification of Letters Patent.      Patented Nov. 27, 1906.

Application filed July 1, 1904. Renewed March 13, 1906. Serial No. 305,813.

*To all whom it may concern:*

Be it known that I, MARIUS OTTO, of 5 Avenue du Bois-de-Boulogne, Paris, France, have invented a certain new and useful Apparatus for the Sterilization of Water by Means of an Electric Current; and I do hereby declare the following to be a full, clear, and exact description of the invention, such as will enable others skilled in the art to which it appertains to make and use the same.

The two difficulties which hinder the purification of small quantities of water by means of ozone are, on the one hand, the necessity for the production of the required quantity of ozone by means of apparatus sufficiently simple and economical and, on the other hand, the provision of an efficacious process which will place water and ozone into contact with one another without requiring the employment of complicated and costly apparatus.

The present invention relates to a system of operation which may be described as "electric filtration," which is adapted to overcome these difficulties perfectly.

The invention consists in principle of a simple arrangement by means of which the ozone or ozonized air necessary for the sterilization of the water is drawn into the producing apparatus by the action of the same stream of water as that which is to be sterilized, the regulating and setting in motion of the stream of water and the stream of ozone being performed by hand or automatically by means of one and the same mechanical contrivance.

The accompanying drawings show as representative examples various practical forms for the carrying out of this invention.

Figure 1:
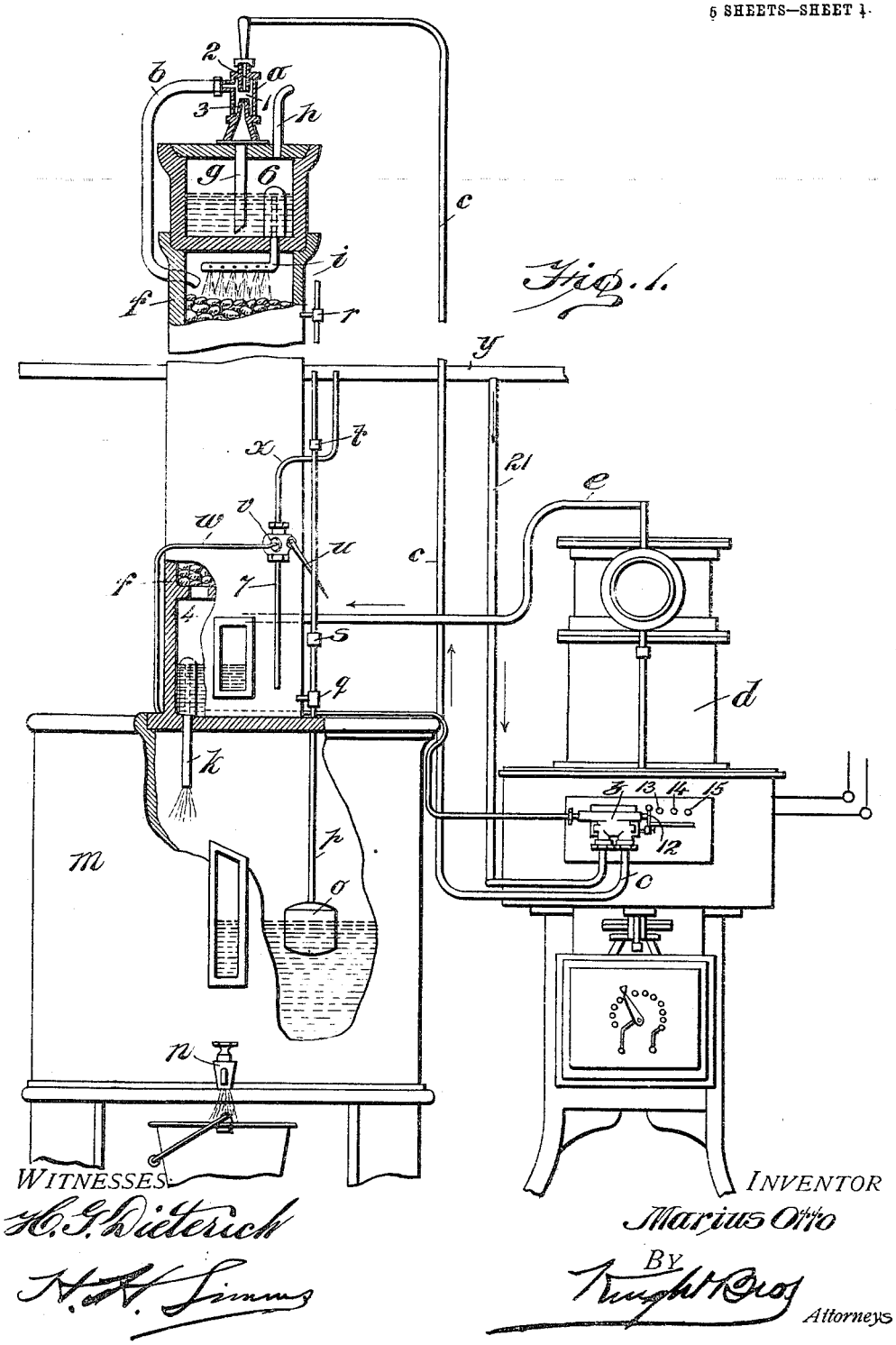
Figure 8:
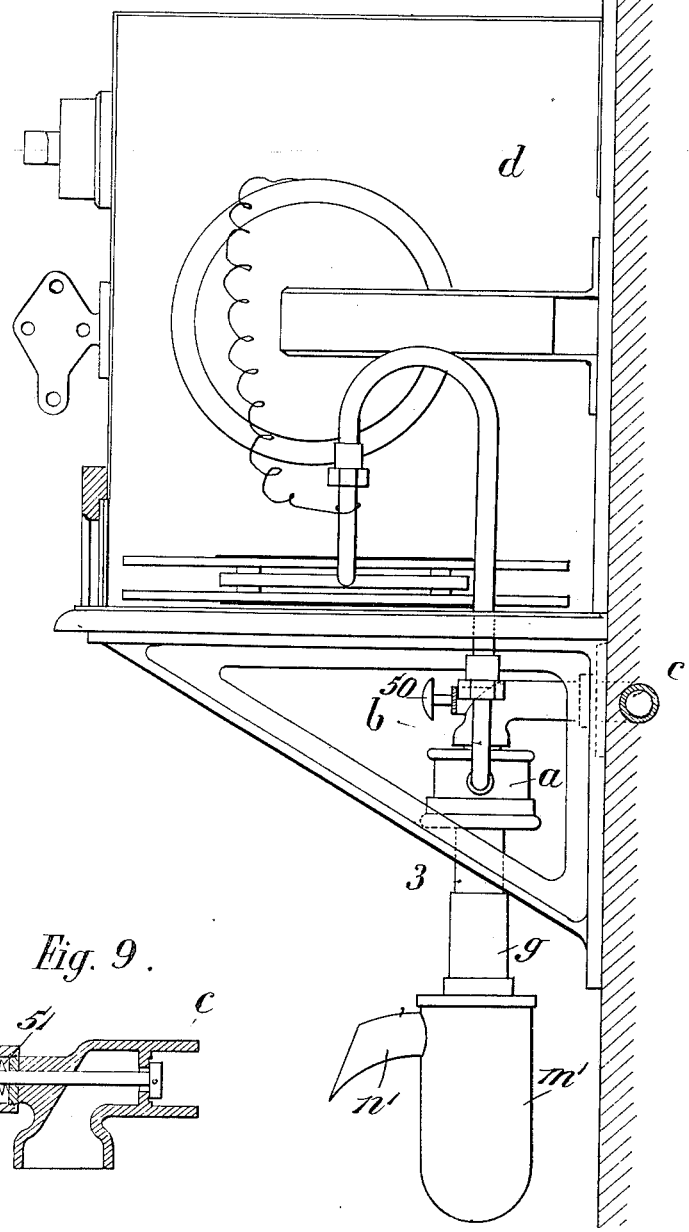
Figure 9:
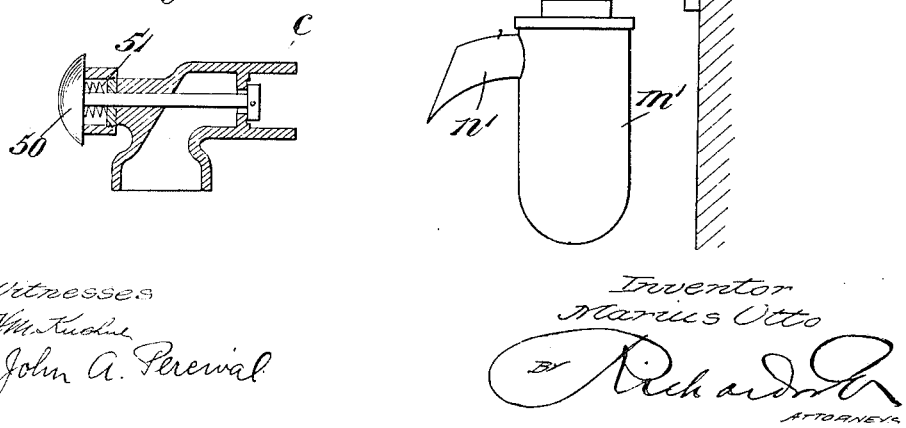

Figure 1 is an elevation, partially in section, of one form of construction, of which Fig. 2 represents in section the device for automatic stopping and starting, Figs. 3 and 4 being the diagrams corresponding to the extreme positions of this device. Figs. 5 and 6 represent in front and side elevation, respectively, a similar apparatus of small capacity. Figs. 7 and 8 represent in front elevation, partially in section and in side elevation, respectively, an apparatus without the Gay-Lussac column to be presently referred to. Fig. 9 is a section of the stopping and starting valve.

In all the various arrangements the water to be sterilized, being, if necessary, first of all cleared from solid matter which it may hold in suspension, is admitted into a sprayer $a$, which is in communication also with the ozone-generator.

The sprayer, which is a kind of injector, consists, as is shown in section in Fig. 1 and more particularly in Fig. 7, of a chamber 1, into which open opposite one another two conical passages 2 and 3. The chamber 1 receives ozone or ozonized air through a pipe $b$, while the water to be sterilized enters from the pipe $c$ into the conical passage 2. The water and sterilizing-gas drawn in by this water are discharged through the conical passage 3.

The apparatus $d$ for producing ozone can be of any known construction. In the example of Fig. 1 the ozonizer $d$ is a rotating ozonizer of high frequency, which is adapted to be connected with the ordinary electricity-distribution circuits of the district.

The ozonized air coming from the ozonizer $d$ through the pipe $e$ enters the lower chamber 4 of a Gay-Lussac column $f$, that being a cylinder filled with coke or other suitable substance. The stream of sterilizing-gas rises in the column into the upper portion 5 of the chamber filled with coke, from which the before-mentioned pipe $b$ is led. The water under pressure flowing through $c$ causes suction in the pipe $b$, and consequently in the column $f$. The water having been finely divided in the sprayer $a$ escapes impregnated with gas through the cone 3 and the pipe $g$. In the chamber 6, Fig. 1, a separation is effected of the excess of ozonized air, which escapes by the pipe $h$. In the apparatus in Fig. 1 the water being freed from the excess of air descends by the pipe $i$ through a rose and falls into the column $f$, where it encounters for the second time an ascending stream of ozone.

The sterilized water escapes through the pipe $k$ and falls into a reservoir $m$, from which it can be drawn off by means of a stop-cock $n$. In this reservoir is placed a float $o$, attached to a rod $p$, which is guided at $q$ and $r$. On this rod are secured two fingers $s$ and $t$, which according as the level of the water is too high or too low, respectively, suitably operate the lever $u$ of the plug of a three-way stop-cock $v$. This stop-cock is connected by a branch $x$ to the feed-pipe $y$ of the water under pressure and by a pipe $w$ to the stopping and starting apparatus $z$.

7 is an escape or overflow pipe leading from the stop-cock $v$.

The apparatus $z$, Figs. 1 and 2, consists of a closed cylinder 8, the end of which is connected to the pipe $w$. In this cylinder a piston 9 operates under the action of a spring 10 and is connected by its rod 11 to a contact 12, adapted to move in front of the contact-knobs 13 14 15 16 of a rheostat. The contact 12 presses by a pointer 17 onto the stem of a valve 18, which according as it is open or shut establishes or intercepts communication between the two passages 19 and 20, into which open, respectively, the pipe 21 for the water under pressure and the ozone-pipe $c$. A reacting-spring 22, which bears against a collar 23, secured to the rod of the valve 18, tends to return the valve to its seat as the contact 12 removes the pointer 17 from the end of the valve-rod, thereby stopping the flow of water through the pipe $c$.

Normally the electric current passes into the ozonizer by means of the contact 13, so that ozone is produced at the same time as the valve 18 is open, and water, coming from the pipe $y$ and the pipe 21 passes from 19 into 20 to rise through the pipe $c$ to the sprayer $a$. In this case the stop-cock $v$ is in the position shown in Fig. 3. When the reservoir $m$ is about to become full of sterilized water, the float $o$, rising into the position shown in Fig. 4, operates the lever $u$ of the stop-cock by means of the finger $s$, whereon the water under pressure will enter by the pipe $w$ into the cylinder 8 and forcing the piston 9 compress the spring 10. The contact 12 will thereby be driven to the non-electrified knob 16. The result will be that the current will cease to flow into the ozonizer, the valve 18 will close, and the apparatus be entirely suspended from working. When the float $o$ sinks sufficiently for the finger $t$ to press down the lever $u$ into the position shown in Fig. 3, the water previously admitted to the cylinder 8 will escape through the pipe 7. The pressure being relieved in 8, the contact 12 will return to the position shown in Fig. 2 and the valve 18 will again open, and so on.

In the form of construction shown in Figs. 5 and 6 the ozone-generator $d$ is inclosed in a box of rectangular shape containing a transformer and operated directly by the electric supply of the district.

Referring to Figs. 7, 8, and 9, the apparatus here shown is somewhat modified in form from that shown in the other figures. In this form the Gay-Lussac column is omitted and the water after being ozonized by being sprayed through the sprayer $a$ falls through the pipe $g$ into a receptacle $m'$, from which it passes off by the outlet $n'$. It will also be seen from these figures that in place of the automatically-operated starting and stopping mechanism a hand-operated valve 50 (see Fig. 9) is inserted in the pipe $c$, which valve is kept normally closed by the action of a spring 51. This apparatus is not intended for keeping a reservoir constantly supplied with sterilized water, but is intended rather for ozonizing water in small quantities, as desired. When the valve 50 is opened by pressing its push-button inwardly, electric current is supplied to the ozone-producer and water is admitted from the main $c$ to operate in the sprayer $a$ and draw ozone from the ozone-chamber. This water is ozonized in the sprayer and runs down through the pipe $g$ into the receiver $m'$ and rising therein flows out by the outlet $n'$ in a constant stream until the valve 50 is allowed to be returned to its seat by the returning influence of its spring 51. Any form of ozone-producer, such as $d$, may be employed in this modification.

I claim—

1. In an apparatus for sterilizing water by ozone, the combination of the mixing device, means for supplying water thereto, means for producing ozone, means for delivering the ozone to said mixing device and a receptacle for the ozonized water; of means operated by the rise and fall of ozonized water in the said receptacle for controlling the supply of water to said mixing device.

2. In an apparatus for sterilizing water by ozone, the combination with a mixing device, means for supplying water thereto, means for producing ozone, means for supplying electric current thereto means for delivering the ozone produced to said mixing device, and a reservoir for the ozonized water; of means operated by the rise and fall of the ozonized water in the reservoir for controlling the supply of electric current to said producing means.

3. In an apparatus for sterilizing water by ozone, the combination with a mixing device, means for supplying water thereto, means for producing ozone, means for delivering the ozone produced to said mixing device and a reservoir for the ozonized water; of means operated by the rise and fall of the ozonized water in said reservoir, controlling the supply of water delivered to said mixing device and the amount of ozone produced by said producing means.

4. In an apparatus for sterilizing water by ozone, the combination with an ozone-producer, water-supply, a cylinder, and a piston therein adapted to control by its movement the production of ozone and the supply of water to be sterilized; of automatic means for admitting water under pressure to said cylinder to cause said piston to move.

5. In an apparatus for sterilizing water by ozone, the combination with the ozonizer, a spraying device, and means operated by said spraying device for inducing a current of ozone thereto from the ozonizer; of hydraulic means controlling the supply of water to said spraying device.

6. In an apparatus for sterilizing water by ozone, the combination with an ozonizer, a circuit for supplying electric current to said ozonizer and a reservoir for ozonized water; of means operated by the rise and fall of ozonized water in said reservoir for controlling the supply of electric current by said circuit.

7. In an apparatus for sterilizing water by ozone, the combination with an ozone-producer, water-supply, a receptacle for the ozonized water, a cylinder, and a piston therein adapted to control by its movement the production of ozone and the supply of water to be sterilized, of means operated by the rise and fall of the ozonized water in said receptacle adapted to admit water to said cylinder to cause said piston to move.

8. In an apparatus for sterilizing water by ozone, the combination with a means for producing ozone, means for supplying water, means for mixing the ozone with the water, and a receptacle for the mixed ozone and water; of a hydraulic means adapted to control the production of ozone, and means controlled by the rise and fall of the water in said receptacle for operating said hydraulic means.

9. In an apparatus for sterilizing water by ozone, the combination with means for producing ozone, a circuit adapted to supply electric current to said ozone-producing means, means for supplying water, means for mixing the water supplied with the ozone produced, and a receptacle for the mixed water and ozone; of hydraulic means adapted to close the circuit for supplying current to said ozone-producer, and means operated by the rise and fall of the ozonized water in said receptacle for operating said hydraulic means.

10. In an apparatus for sterilizing water by ozone, the combination with a mixing device, means for supplying ozone thereto, means for supplying water thereto, and a receptacle for the mixed ozone and water; of hydraulic means adapted to control the supply of water to said mixing device, and means controlled by the rise and fall of the water in said receptacle for operating said hydraulic means.

11. In an apparatus for the sterilization of water by ozone, the combination with means for producing ozone, means for supplying water, a mixing device for the water supplied and the water produced, and a receptacle for the mixed water and ozone; of a circuit adapted to supply electric current to said ozone-producing means, hydraulic means adapted to control the supply of electric current to said ozone-producing means by said circuit and the supply of water by said water-supplying means, and means controlled by the rise and fall of the water in said receptacle for operating said hydraulic means.

12. In an apparatus for sterilizing water by ozone, the combination with a rheostat adapted to control the supply of electric current, and a valve adapted to control the supply of water; of a cylinder, a piston thereon adapted by its movement to operate said rheostat and said water-controlling valve and automatic means for admitting water to said cylinder to move said piston.

13. In an apparatus for sterilizing water by ozone, the combination with means for producing ozone, means for supplying electric current thereto, a rheostat in said current-supplying means, a mixing device, means for supplying water thereto, means for supplying the ozone produced to said mixing device, a valve adapted to control the supply of water to said mixing device, and a receptacle for the mixed water and ozone; of a cylinder, a piston thereon adapted by its movement to operate said rheostat and said water-controlling valve, and means operated by the rise and fall of the ozonized water in said receptacle for delivering water to said cylinder to cause said piston to move.

14. In an apparatus for sterilizing water by ozone, the combination with means for producing ozone, a mixing device, means for supplying ozone thereto, means for supplying water thereto, and a receptacle for the ozonized water, of a hydraulic controlling means for controlling the production of ozone and the supply of water, including a spring for holding said controlling means normally in inoperative position, and means controlled by the rise and fall of the ozonized water in said receptacle for moving said controlling means into operative position.

15. In a water-sterilizing apparatus, the combination with an ozone-supplying means, water-supplying means, and means for supplying electric current to said ozone-supplying means, of means for simultaneously turning on or shutting off the current-supplying means and water-supplying means.

16. In a water-sterilizing apparatus, the combination with an ozone-supplying means, water-supplying means, and means whereby the water supplied by the water-supplying means draws ozone from the ozone-supplying means; of means for supplying electric current to said ozone-supplying means, and means for simultaneously turning on or shutting off the current-supplying means and the water-supplying means.

17. The combination with a primary mixer, and means for supplying ozone thereto; of a secondary mixer having its discharge-passage in communication with the primary mixer, water-supplying means for the secondary mixer, and means whereby the water-supplying means draws ozone from the primary mixer through said discharge-passage and delivers it with the water to the secondary mixer.

18. The combination with a primary mixer, and means for supplying ozone thereto; of a secondary mixer having its discharge-passage communicating with the primary mixer, an emulsifier discharging into said secondary mixer, water-supplying means for said emulsifier, and means whereby said water-supplying means draws in ozone from the primary mixer through the discharge-passage of the secondary mixer.

19. The combination with a primary mixer, means for supplying ozone thereto, a secondary mixer discharging into the primary mixer, an emulsifier discharging into the secondary mixer, means for supplying water to the emulsifier, and means whereby the water-supplying means draws in ozone from the primary mixer through the secondary mixer; of a hydraulic seal receiving mixed ozone and water from the primary mixer and returning the unused ozone to the ozone supplied to that mixer.

20. A sterilizing device, comprising a mixer, an emulsifier discharging the water to be sterilized thereinto, means for supplying water to said emulsifier, an ozone-supplying means, and means whereby the water-supplying means draws in ozone from the ozone-supplying means and carries it to said emulsifier.

21. The combination with a mixer, and an emulsifier adapted to deliver ozone and water to said mixer, of a hydraulic seal forming a separating-chamber for the excess ozone and receiving mixed ozone and water from said mixer, and an escape for the separated ozone.

22. The combination with a mixer, an emulsifier discharging thereinto, means for supplying water to said emulsifier, means for supplying ozone, and means whereby the water-supplying means draws in ozone from the ozone-supplying means and carries it to the emulsifier; of a hydraulic seal forming a separating-chamber for the excess ozone and receiving mixed ozone and water from said mixer, and an escape therein for the separated ozone.

In witness whereof I have hereunto set my hand in presence of two witnesses.

MARIUS OTTO.

Witnesses:
  LOUIS GARDET,
  HANSON C. COXE.